Sept. 1, 1936.          F. G. WILLIAMS                    2,052,591
                    OPTICAL TESTING STAND
                    Filed Oct. 16, 1934            2 Sheets—Sheet 2
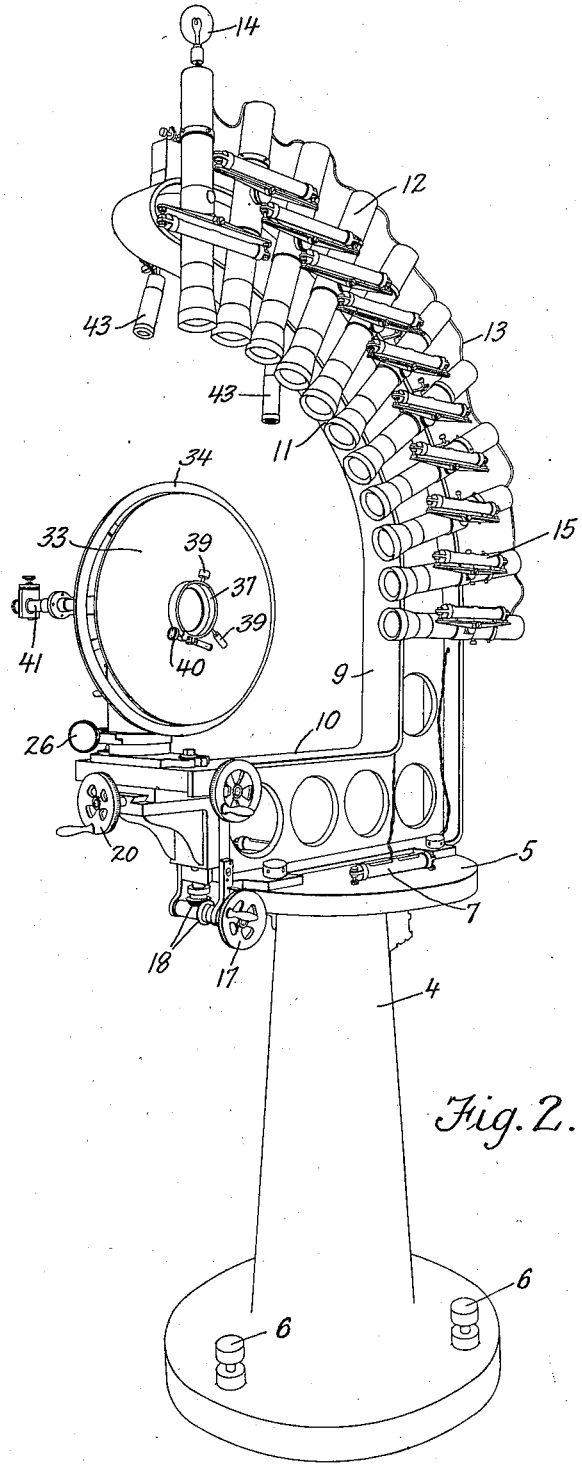
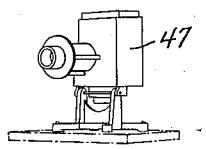
Fig. 3.
Fig. 2.
INVENTOR
F.G.Williams
BY
Harold Dodd
ATTORNEY Patented Sept. 1, 1936

2,052,591

UNITED STATES PATENT OFFICE 2,052,591

OPTICAL TESTING STAND

Franklin G. Williams, Washington, D. C.

Application October 16, 1934, Serial No. 748,499

5 Claims. (Cl. 88—2.2)

(Granted under the act of March 3, 1883, as amended April 30, 1928; 370 O. G. 757)

This invention relates to apparatus for testing optical instruments of the octant or sextant type and has for its object to provide means for determining the error in the indication of the instrument for given angular movements of the optical axis of the instrument and also to determine the errors introduced by tilting the instrument from its normal plane and those due to the use of shade glasses.

In the drawings:

Fig. 2 is a perspective view of the entire stand taken substantially 90° from Fig. 1;

Fig. 3 represents an artificial sun used in testing with shade glasses.

Figure 1:
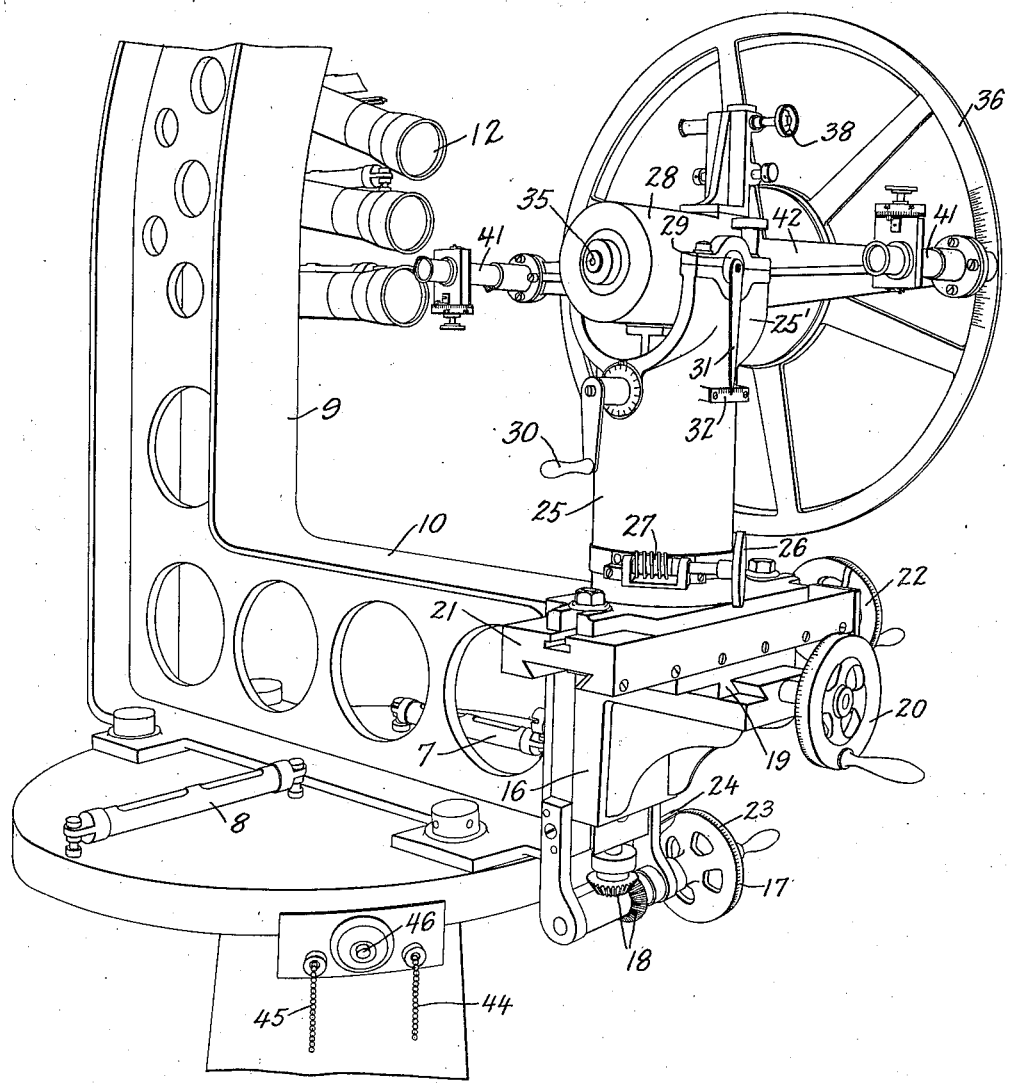
Fig. 1 is perspective view of the principal operating parts of my invention.

It is well known that the readings obtained from instruments of the octant and sextant type are not absolutely accurate and the deviation from accuracy is different for various changes in the angular position of the optical axis. Further, errors are introduced if the instrument is not held in a certain plane and other errors are caused when shade glasses are employed to diminish the intensity of the light. The present invention determines accurately the presence and magnitude of such errors.

As is shown in Fig. 2, the stand comprises a heavy pedestal having an upper surface 5, that is made accurately horizontal by means of leveling screws 6, bubble levels 7 and 8 being provided to show when the surface 5 is horizontal. A rigid arm 9 is firmly secured to the base 4 against surface 5, this arm having a horizontal portion 10 and an arcuate portion 11.

A plurality of collimators 12, are secured against one side face of the arcuate portion 11 of arm 9 over an angular extent of one quadrant, the optical axes of the collimators being preferably uniformly angularly spaced and all passing through a common point at the center of the quadrant defined by the collimators. Each collimator 12 is provided with an electric light bulb and all the bulbs are connected in series by the wire 13, a pilot light 14 being also connected in series with the collimator lights to indicate when all of the latter are lighted. Secured to the tube of each collimator 12 is a level 15 which is accurately positioned with respect to the optical axis of the collimator and at such angle to that axis that when the bubble level is in its central position the axis of the collimator has the required inclination.

Mounted upon the horizontal portion 10 of arm 9, is a universal traversing mechanism such as is well known on machine tools. It comprises a vertically movable slide 16, operable by means of hand wheel 17 and bevel gears 18 which drive a screw engaged with slide 16 in a manner well known. Traverse parallel to the portion 10 is effected by a slide 19 mounted on slide 16 and operable by hand wheel 20, while movement at right angles to the portion 10 is effected by the slide 21 carried by slide 19 and actuated by handwheel 22. Each of the hand wheels 17, 20 and 22 has a calibrated periphery as indicated at 23, which calibrations are readable against an index 24.

Carried by slide 21 is a tubular member 25 which is formed into two arms 25' at its upper end. The member 25 is mounted on the slide 21 to be rotatable about its vertical axis by means of handwheel 26, worm 27 and gear (not shown) on the member 25 meshed with worm 27. A journal 28 is mounted in the arms 25' to be swingable about gudgeons 29, the tilting thereof being effected by crank 30 and the inclination of the longitudinal axis thereof to the horizontal being indicated by pointer 31 which moves over scale 32. A plate 33 and concentric spider 34 are fixed to shaft 35 which is rotatable in journal 28, the face 36 of the spider 34 being calibrated in units of arc. A cup 37 is mounted on the free face of plate 33, the angular position of the cup being susceptible of micrometer adjustment by means of the screw 38 which acts upon a radial arm which may be engaged by means of a clutch (not shown) to the shaft 35 and which in turn is connected to the cup 37. Screws 39 are threaded into and extend through the wall of cup 37 to contact the instrument to be tested which is mounted in cup 37, the perimeter of the free edge of cup 37 being variable by means of clamp screw 40.

Micrometer reading microscopes 41 are mounted in arms 42 carried by journal 28 and are disposed to read the calibrations on face 36 of spider rim 37, the lights 43 being positioned to project a beam of light upon the face 36 adjacent each of the microscopes 41.

The collimator lights are controlled by a switch actuatable by chain 44, the artificial sun, hereinafter described, being controlled by a switch operated by chain 45 and the lights 43 by switch 46.

The artificial sun 47, shown in Fig. 3, is constructed to provide a luminous area that substantially corresponds, in the angle intercepted thereby, to the natural sun and is used for determining the errors in reading an octant introduced through the interposition of shade glasses between the optical system and the source of light.

The mode of use is as follows:

The instrument to be tested is secured in the cup 37 with the optical axis of the telescope thereof in alignment with the optical axis of the horizontally extending collimator in the bottom of the series and with the indicated reading on the instrument at zero. Any adjustments necessary to secure such alignment are made by traversing any of the slides 16, 19 and 21 or by rotating the tubular member 25 and very fine adjustment is secured through the screw 38 and the mechanism cooperating therewith. After having effected such alignment the plate 33 is rotated to bring the optical axis of the instrument being tested into alignment with the beam of light from the next higher collimator, the indicated angle being read on the instrument and the accuracy thereof being checked by noting the angular movement of spider 34 and since means are provided for taking micrometer readings of the rotational movement of the spider a very accurate check can be made of the indication of the instrument under test. This process is repeated, bringing the optical axis of the octant successively into alignment with the optical axes of the collimators through the entire series from zero to 90°.

The error introduced by a given lateral displacement of the octant from a vertical plane, for each interval of vertical angle is determined by rotating crank 30 to tilt the journal 28 and so move the instrument secured in cup 37 a known angular magnitude out of a vertical position and then bringing the optical axis of the instrument into alignment with the collimators as above described.

The invention described herein may be manufactured and used by or for the Government of the United States of America for governmental purposes without the payment of any royalties thereon or therefor.

I claim:

1. A stand for testing optical angle-measuring instruments, comprising a base having an accurately horizontal upper surface, a rigid arcuate arm secured against said surface, said arm having a vertically extending face, a plurality of collimators secured against said face in a circular arc of one quadrant, the optical axis of each of said collimators being substantially uniformly angularly spaced from the axes of the collimators adjacent thereto, and all said axes passing through a common point, a rotatable member mounted with its axis of rotation normally passing through said common point transversely to said optical axes, means to fix to said member an instrument to be tested so that the optical axis thereof may be brought selectively into coincidence with the optical axes of the collimators, and means to measure the angles through which said instrument is rotated in securing such coincidence of the axes.

2. A stand for testing optical angle-measuring instruments, comprising a base having an accurately horizontal upper surface, a rigid arcuate arm secured against said surface, said arm having a vertically extending face, a plurality of collimators secured against said face in a circular arc of one quadrant, the optical axis of each of said collimators being substantially uniformly angularly spaced from the axes of the collimators adjacent thereto, and all said axes passing through a common point, a rotatable member mounted with its axis of rotation normally passing through said common point transversely to said optical axes, means to fix to said member an instrument to be tested so that the optical axis thereof may be brought selectively into coincidence with the optical axes of the collimators, means to tilt said member about an axis perpendicular to the axis of rotation of said member, and means to measure the angles through which said member is rotated to secure such coincidence of the axes.

3. A stand for testing optical angle-measuring instruments, comprising a plurality of collimators disposed in a circular arc, the optical axes of said collimators being in predetermined angular relation, mounting means to support at the center of said circular arc an instrument to be tested, in position for bringing the optical axis of such instrument selectively into coincidence with the optical axes of the collimators, and means to measure the angular movement of such instrument in securing such coincidence of the axes.

4. A stand for testing optical angle-measuring instruments, comprising means to provide a plurality of beams of parallel light, the axes of said beams being in predetermined angular relation and passing through a common point, means to support adjacent said common point an instrument to be tested, in position to have its optical axis brought selectively into coincidence with the axes of said beams, means to tilt said supporting means transversely to the axes of said beams, and means to measure the angle through which the instrument being tested is moved in securing the said coincidence of said axes.

5. A stand for testing optical angle-measuring instruments, comprising means to provide a plurality of beams of parallel light, the axes of said beams being in predetermined angular relation and passing through a common point, means for mounting adjacent said common point an instrument to be tested, in position to have its optical axis brought selectively into coincidence with the axes of said beams, means for measuring accurately vertical angles through which the optical axis of said instrument is rotated by movement of said mounting means, means for tilting said mounting means transversely to the said vertical movement of the said optical axis, and means for measuring the angle of such tilt, whereby the errors in the indication of vertical angles, introduced into the readings of said instrument by such tilting, through any given angle may be ascertained.

FRANKLIN G. WILLIAMS.